US006894896B2

(12) United States Patent
Lin

(10) Patent No.: US 6,894,896 B2
(45) Date of Patent: May 17, 2005

(54) PORTABLE HEAT-DISSIPATING DEVICE FOR A NOTEBOOK COMPUTER

(76) Inventor: Jen-Cheng Lin, 9 Fl., No. 786, Chung-Cheng Rd., Chung-Ho City, Taipei Hsien (TW)

( * ) Notice: Subject to any disclaimer, the term of this patent is extended or adjusted under 35 U.S.C. 154(b) by 192 days.

(21) Appl. No.: 10/436,131

(22) Filed: May 13, 2003

(65) Prior Publication Data

US 2004/0228086 A1 Nov. 18, 2004

(51) Int. Cl.[7] .............................................. H05H 7/20
(52) U.S. Cl. ...................... 361/695; 361/687; 454/184
(58) Field of Search ...................... 165/80.3, 121–122; 361/687, 694–695; 454/184

(56) References Cited

U.S. PATENT DOCUMENTS

| | | | | |
|---|---|---|---|---|
| 6,239,971 B1 | * | 5/2001 | Yu et al. ..................... | 361/695 |
| 6,687,123 B2 | * | 2/2004 | Kitahara ..................... | 361/695 |
| 6,707,668 B2 | * | 3/2004 | Huang ........................ | 361/687 |
| 6,738,256 B2 | * | 5/2004 | Hsieh et al. ................ | 361/687 |
| 6,781,833 B2 | * | 8/2004 | Lu ............................. | 361/695 |

* cited by examiner

Primary Examiner—Gregory Thompson
(74) Attorney, Agent, or Firm—Rabin & Berdo, P.C.

(57) ABSTRACT

A portable heat-dissipating device for a notebook computer has a top casing, a bottom casing, a fan assembly and a container. The top casing and the bottom casing are mounted together, and the fan assembly and the container are held between the top casing and the bottom casing. The fan assembly is used to dissipate the heat from the notebook computer. The container holds a peripheral device for the notebook computer to decrease space required to carry peripheral devices for the notebook computer.

5 Claims, 4 Drawing Sheets

PORTABLE HEAT-DISSIPATING DEVICE FOR A NOTEBOOK COMPUTER

BACKGROUND OF THE INVENTION

1. Field of the Invention

The present invention relates to a heat-dissipating device, and more particularly to a portable heat-dissipating device for a notebook computer.

2. Description of Related Art

Computers have become a common tool used almost everyday in most homes. The computer not only makes previously complicated tasks relatively simple, but also allows people to do things previously considered impossibly complex or difficult or simply too time-consuming. In modern life, computers are playing a more and more important role. For business people required to work or speak away from their offices, notebook computers are becoming common tools because notebook computers are convenient to take out of the office and use. The important features of the notebook computers are its light weight and small volume. As notebook computers have become more powerful, they generate much more heat and have a higher internal temperature. High internal temperatures damage the electrical and electronic components of the notebook computers. The small size of the notebook computers limits the size of heat dissipating devices that can be mounted in the notebook computers. Consequently external heat-dissipating devices have been developed to decrease the temperature of notebook computers.

A conventional portable heat-dissipating device for notebook computers is a pad and comprises a casing and two fan assemblies in the casing. The casing has left end and right end. The two fan assemblies are mounted respectively in the left end or the right end of the casing. The notebook computer is placed on the portable heat-dissipating device, and the two fan assemblies in the portable heat-dissipating device blow air onto the notebook computer to cool the notebook computer and reduce the high internal temperature.

Notebook computers have a left and right end, and CPUs in notebook computers are generally mounted in either the left or right end of the notebook computer to accommodate the arrangement of internal components. Since modern CPUs generate more heat than other internal components, one of the two fan assemblies in the portable heat-dissipating device will have much more heat to dissipate to cool the notebook computer.

As notebook computers have become smaller, external peripheral devices have proliferated to make notebook computers fully capable of meeting the needs of people without unduly raising the cost of the notebook computer. Therefore, business people traveling or working outside the office must choose which peripheral devices to carry, which makes space for a portable heat-dissipation device limited.

Therefore, the invention provides a portable heat-dissipating device for a notebook computer to mitigate or obviate the aforementioned problems.

SUMMARY OF THE INVENTION

The main objective of the present invention is to provide a multi-functional portable heat-dissipating device for a notebook computer. The portable heat-dissipating device not only provides a portable heat-dissipating function, but also doubles as a container to hold a peripheral device for a notebook computer.

To achieve the objective, a portable heat-dissipating device for a notebook computer in accordance with the present invention comprises a top casing, a bottom casing, a fan assembly and a container. The top casing and the bottom casing are mounted together, and the fan assembly and the container are mounted between the top casing and the bottom casing. The fan assembly is dissipates the heat from the notebook computer. The container contains a peripheral device for the notebook computer to decrease space required to carry peripheral devices for the notebook computer.

Further benefits and advantages of the present invention will become apparent after a careful reading of the detailed description with appropriate reference to the accompanying drawings.

DETAILED DESCRIPTION OF THE INVENTION

Figure 1:
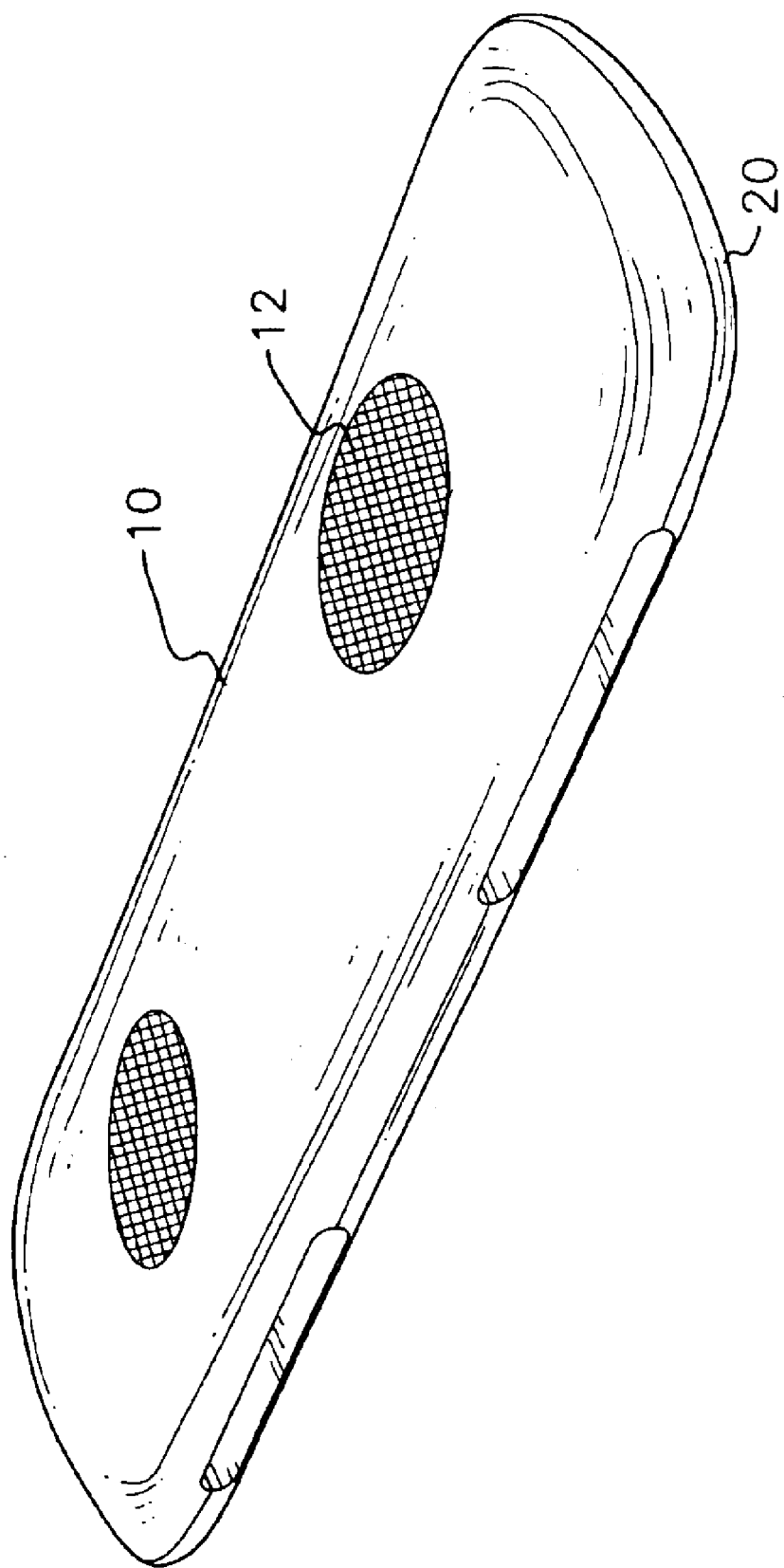
FIG. 1 is a perspective view of a portable heat-dissipating device for a notebook computer in accordance with the present invention.
Figure 2:
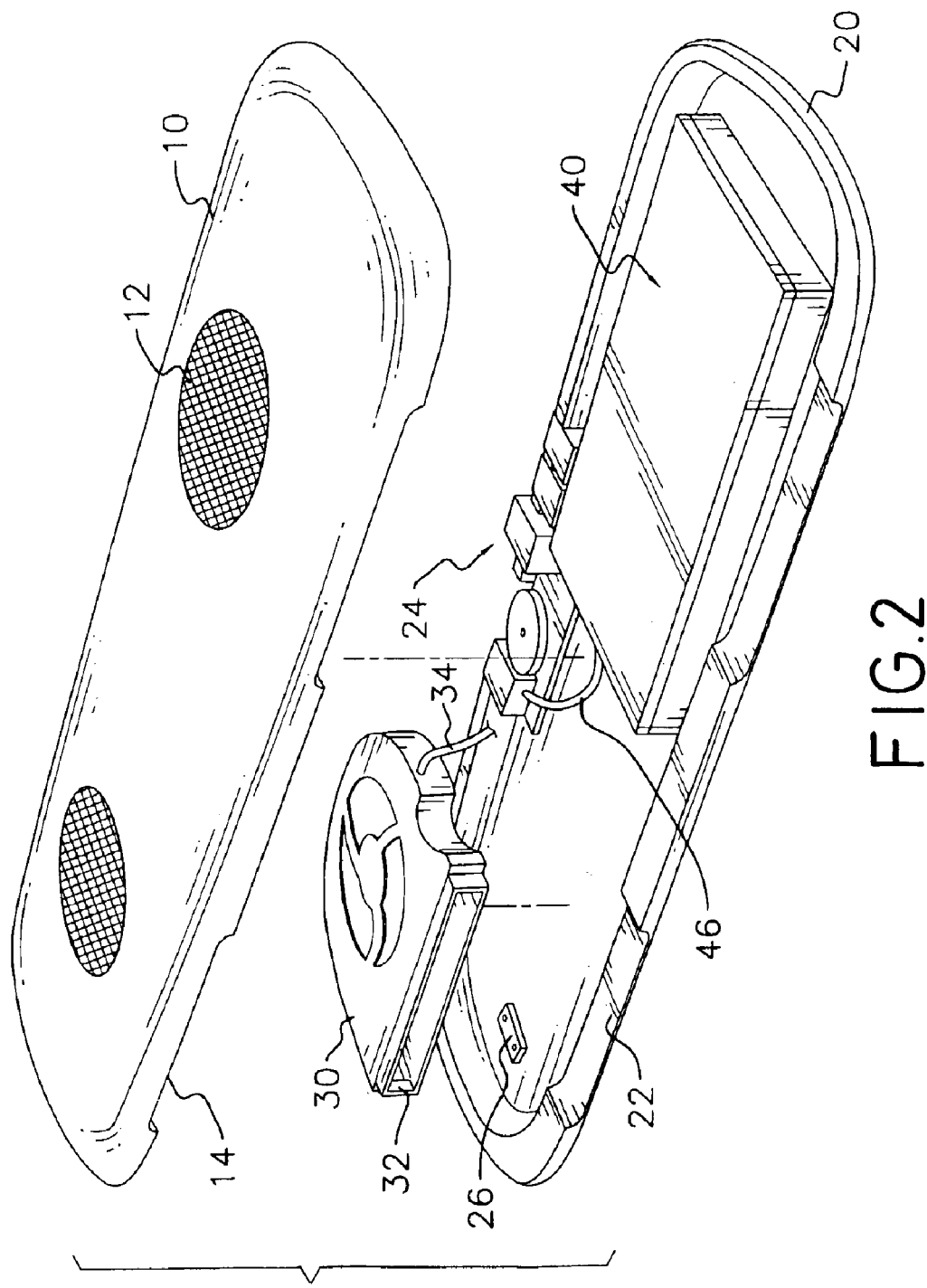
FIG. 2 is an exploded perspective view of the portable heat-dissipating device in FIG. 1.
Figure 3:
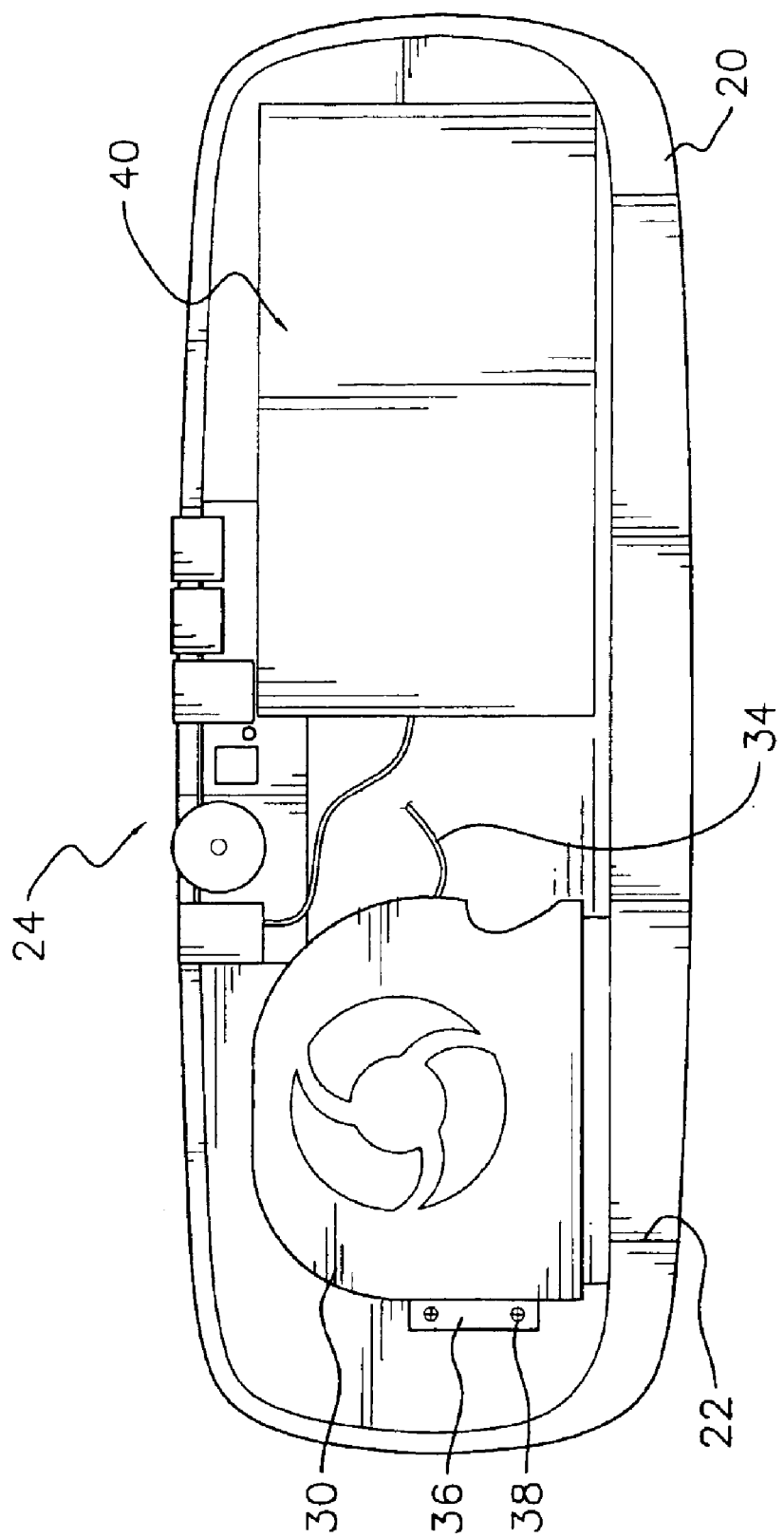
FIG. 3 is a top plan view of the portable heat-dissipating device in FIG. 1 with the top casing removed.

With reference to FIGS. 1, 2 and 3, a preferred embodiment of a portable heat-dissipating device for a notebook computer in accordance with the present invention is a pad (not numbered) and comprises a top casing (10), a bottom casing (20), a fan assembly (30) and a container (40).

The top casing (10) is rectangular and has rounded corners (not numbered), an outside surface (not numbered), a sidewall (not numbered), multiple air vents (12) and multiple upper exhaust slots (14). The multiple air vents (12) are formed through the outside surface of the top casing (10). The upper exhaust slots (14) are formed in the sidewall of the top casing (10) and correspond respectively to the air vents (12). In the embodiment described, the top casing (10) has two air vents (12) with grilles in the outside surface and two upper exhaust slots (14) in the sidewall corresponding respectively to the air vents (12).

The bottom casing (20) corresponds to the top casing (10), is rectangular, has rounded corners (not numbered), an inside surface (not numbered), a sidewall (not numbered), multiple bottom exhaust slots (22) and a controller (24) and houses the fan assembly (30) and the container (40). The multiple bottom exhaust slots (22) are formed in the sidewall of the bottom casing (20) and correspond respectively to the upper exhaust slots (14) in the sidewall of the top casing (10) to form exhaust ports (not numbered). The exhaust ports provide a path for air discharged from the fan assembly (30) to flow out of the portable heat-dissipation device.

The controller (24) is mounted on the inside surface and has multiple switches (not numbered), multiple sockets (not numbered) and an external power supply socket (not numbered).

Optionally, a fan assembly connector (26) can be mounted in the bottom casing (20). The fan assembly connector (26) would be formed on the inside surface and would connect the fan assembly (30) to the bottom casing (20). In the embodiment described, the fan assembly connector (26) is rectangular and has multiple threaded holes (not numbered) to attach the fan assembly (30) to the fan assembly connector (26).

The fan assembly (30) is mounted on the inside surface of the bottom casing (20) and has a top (not numbered), a sidewall (not numbered), an inlet (not numbered), an outlet (32), a fan motor (not shown) and a wire (34). The inlet is formed through the top and corresponds to one air vent (12). The outlet (32) is formed through the sidewall and corresponds to a corresponding exhaust port when the top casing (10) is mounted on the bottom casing (20). The wire (34) is connected between the fan motor and the controller (24) and runs on DC power at various speeds. The switches of the controller (24) control the speed of and DC power to the fan motor. When the bottom casing (20) has a fan assembly connector (26), the fan assembly (30) will have a bottom casing connector (36). The bottom casing connector (36) is formed integrally with and extends from the sidewall of the fan assembly (30) and is connected to the fan assembly connector (26) on the inside surface of the bottom casing (20) with screws (38) or an adhesive. In the embodiment described, the bottom casing connector (36) is rectangular and has multiple through holes (not numbered) in the bottom casing connector (36). The screws (38) extend respectively through the through holes in the bottom casing connector (36) of the fan assembly (30) and screw into the threaded holes in the fan assembly connector (26) on the bottom casing (20).

The container (40) is mounted on the inside surface of the bottom casing (20), holds a peripheral device for a notebook computer and has an inner surface (not shown), an inner socket (not shown) and a wire (46). The container (40) can be any shape that will fit between the top casing (10) and the bottom casing (20). The peripheral device of the notebook computer could be an external card reader, a computer-to-computer interface or other thin peripheral devices. The wire (46) is connected between the container (40) and the controller (24) on the inside surface of the bottom casing (20). The inner socket is mounted on the inner surface of the container (40) and is connected to the wire (46). The peripheral device for the notebook computer is placed in the container (40) and connected to the inner socket. The switch in the controller (24) on the inside surface of the bottom casing (20) controls DC power to the peripheral device for the notebook computer in the container (40).

Figure 4:
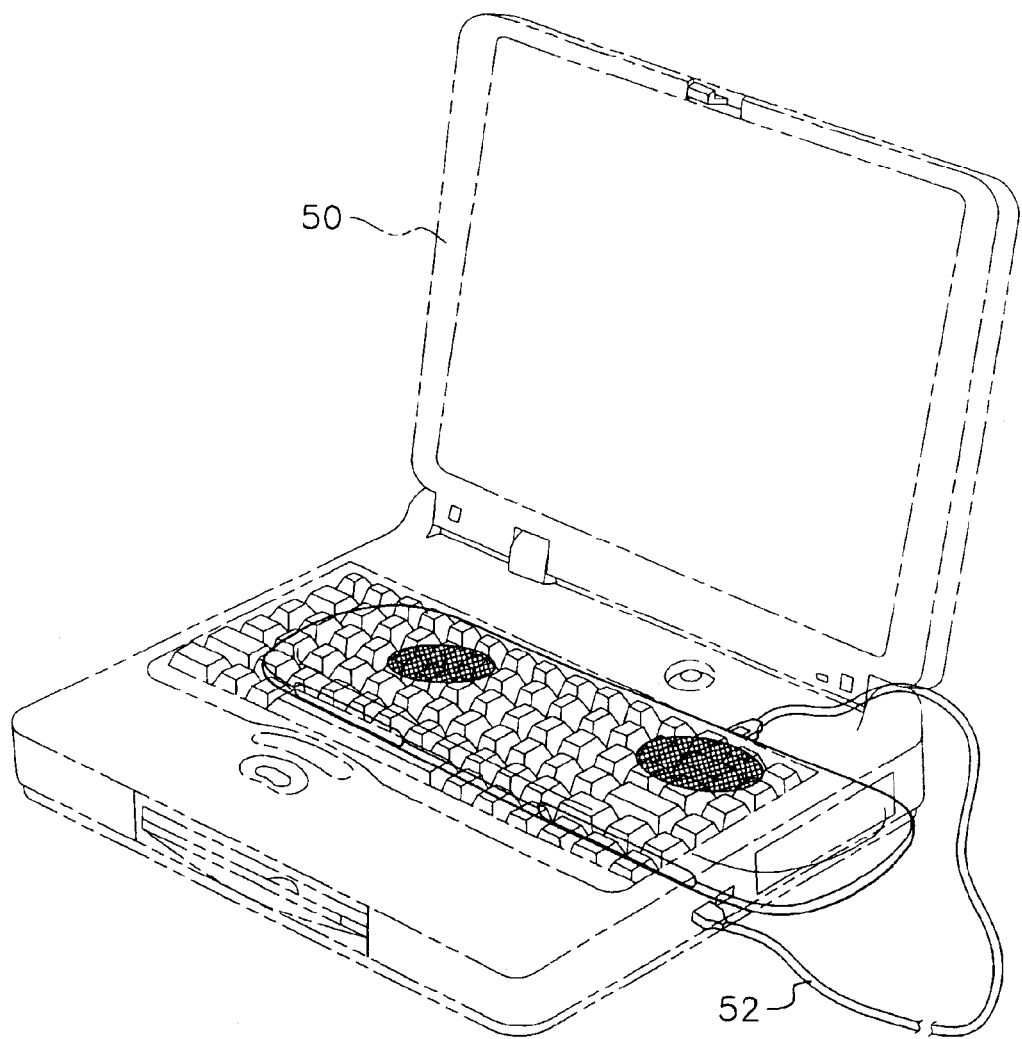
FIG. 4 is an operational perspective view of the portable heat-dissipating device in FIG. 1 used with a notebook computer.

With further reference to FIG. 4, the notebook computer (50) has a bottom (not numbered) that is placed on the top casing (10) of the portable heat-dissipating device at an incline so a space (not numbered) is formed between the bottom of the notebook computer (50) and the portable heat-dissipating device. The notebook computer (50) uses a cord (52) to connect the notebook computer (50) to the controller (24) in the portable heat-dissipating device. The peripheral device for the notebook computer (50) communicates with the notebook computer (50) through the controller (24) and the cord (52). Furthermore, the portable heat-dissipating device can use a wire (not shown) to connect an external power supply through an external power supply socket (not numbered) of on the controller (24) on the bottom casing (20).

When the notebook computer (50) produces heat that raises the working temperature, the operating fan assembly (30) draws heat away from the notebook computer through the air vent (12) in the top casing (10) and discharges the heat out of the outlet (32) in the fan assembly (30) and away from the notebook computer. The fan assembly (30) continually passes the heat through the exhaust port formed by the upper exhaust slot (14) in the top casing (10) and the bottom exhaust slot (22) in the bottom casing (20), away from the bottom of the notebook computer (50). The heat is blown from the space between the portable heat-dissipating device and the bottom of the notebook computer (50) to dissipate in the ambient environment.

The portable heat-dissipating device for a notebook computer effectively dissipates heat from the notebook computer and lowers the high internal temperature in the notebook computer (50). The container (40) holds a peripheral device for the notebook computer (50) and decreases space required to carry peripheral devices for the notebook computer (50).

Although the invention has been explained in relation to its preferred embodiment, many other possible modifications and variations can be made without departing from the spirit and scope of the invention as hereinafter claimed.

What is claimed is:

1. A portable heat-dissipating device for a notebook computer comprising a top casing, a bottom casing, a fan assembly and a container, wherein:

the bottom casing has an inside surface, a sidewall, multiple bottom exhaust slots, a controller, wherein
the multiple bottom exhaust slots are formed in the sidewall of the bottom casing; and
the controller is mounted on the inside surface and has multiple switches, multiple sockets and an external power supply socket;

the fan assembly is mounted on the inside surface of the bottom casing and has a top, a sidewall, an inlet, an outlet, a fan motor, a bottom casing connector and a wire, wherein
the inlet is formed through the top;
the outlet is formed through the sidewall; and
the wire is connected between the fan motor and the controller on the inside surface of the bottom casing;

the container is mounted on the inside surface of the bottom casing and has an inner surface, an inner socket and a wire, wherein
the wire is connected between the container and the controller on the inside surface of the bottom casing; and
the inner socket is mounted in the inner surface of the container and is connected to the wire; and the top casing corresponds to and covers the bottom casing and has an outside surface, a sidewall, multiple air vents and multiple upper exhaust slots, wherein
the multiple air vents are formed through the outside surface of the top casing and one of the multiple air vents corresponds to the inlet in the fan assembly; and
the multiple upper exhaust slots are formed in the sidewall of the top casing and correspond respectively to bottom exhaust slots in the sidewall of the bottom casing to form exhaust ports, and the exhaust ports correspond respectively to the air vents through the top casing and the outlet in the fan assembly corresponds to one of the exhaust ports.

2. The portable heat-dissipating device for a notebook computer as claimed in claim 1, wherein the top casing is rectangular and has rounded corners, and the bottom casing corresponds to the top casing, is rectangular and has rounded corners.

3. The portable heat-dissipating device for a notebook computer as claimed in claim 1, wherein the top casing has two air vents in the outside surface and two upper exhaust slots in the sidewall corresponding to the air vents respectively; and the bottom casing has two bottom exhaust slots in the sidewall corresponding to the upper exhaust slots respectively.

4. The portable heat-dissipating device for a notebook computer as claimed in claim 1, wherein the fan assembly bottom casing connector formed integrally with and extending from the fan assembly; and the bottom casing has a fan assembly connector is formed on the inside surface and connected to the bottom casing connector to mount the fan assembly on the inside surface of the bottom casing.

5. The portable heat-dissipating device for a notebook computer as claimed in claim 4, wherein the fan assembly connector is rectangular and has multiple threaded holes;

the bottom casing connector is rectangular and has multiple through holes; and multiple screws respectively extend through the through holes in the bottom casing connector of the fan assembly and screw into the threaded holes in the inside surface on the fan assembly connector of the bottom casing.

* * * * *